US00RE38785E

(19) United States
(12) Reissued Patent
Schmitt

(10) Patent Number: US RE38,785 E
(45) Date of Reissued Patent: Aug. 30, 2005

(54) LIQUID STORING AND DISPENSING UNIT

(75) Inventor: Anthony L. Schmitt, St. Cloud, MN (US)

(73) Assignee: Ronald S. Carlson, St. Cloud, MN (US)

(21) Appl. No.: 10/075,943

(22) Filed: Feb. 14, 2002

Related U.S. Patent Documents

Reissue of:
(64) Patent No.: 6,135,324
Issued: Oct. 24, 2000
Appl. No.: 09/275,865
Filed: Mar. 25, 1999

U.S. Applications:
(60) Provisional application No. 60/083,683, filed on Apr. 30, 1998.

(51) Int. Cl.[7] ..... B67D 5/60
(52) U.S. Cl. ..... 222/143; 222/185.1
(58) Field of Search ..... 222/129, 143, 222/185.1, 1

(56) References Cited

U.S. PATENT DOCUMENTS

| | | | | |
|---|---|---|---|---|
| 1,735,885 A | | 11/1929 | Towle | |
| 1,875,141 A | | 8/1932 | Powel | |
| 2,457,842 A | | 1/1949 | Smith et al. | |
| 2,793,780 A | | 5/1957 | Walklet et al. | |
| 2,887,251 A | | 5/1959 | Mackridge | |
| 3,306,487 A | | 2/1967 | Gregoire | |
| 3,474,843 A | | 10/1969 | Maris | |
| 3,547,299 A | | 12/1970 | Kepple | |
| 3,583,590 A | * | 6/1971 | Ferraro | 215/10 |
| 3,782,602 A | | 1/1974 | Page | |
| 3,828,964 A | | 8/1974 | Bonnot | |
| 3,955,715 A | | 5/1976 | Topor | |
| 4,050,580 A | | 9/1977 | Wilson | |
| 4,287,997 A | | 9/1981 | Rolfe et al. | |
| D272,574 S | | 2/1984 | Sprinski | |
| 4,648,521 A | | 3/1987 | Thomas et al. | |
| 4,708,253 A | | 11/1987 | Mednis | |
| 4,746,034 A | | 5/1988 | Ata et al. | |
| 4,838,443 A | | 6/1989 | Cripe et al. | |
| 4,887,731 A | | 12/1989 | Pett et al. | |
| 4,930,648 A | | 6/1990 | Hundt | |
| 4,930,661 A | | 6/1990 | Voorhies | |
| 4,947,988 A | | 8/1990 | Schutz | |
| 5,029,734 A | | 7/1991 | Nichols | |
| 5,156,268 A | | 10/1992 | Nichols | |
| 5,199,570 A | | 4/1993 | McKenzie | |
| 5,201,432 A | | 4/1993 | Elvin-Jensen | |
| 5,226,558 A | | 7/1993 | Whitney et al. | |
| D338,329 S | | 8/1993 | Cornwall | |
| 5,249,684 A | | 10/1993 | Sterett | |
| 5,307,956 A | | 5/1994 | Richter et al. | |
| 5,501,334 A | | 3/1996 | Przytulla et al. | |
| 5,535,908 A | | 7/1996 | Sheu | |
| 5,544,777 A | | 8/1996 | Watson | |
| 5,595,318 A | | 1/1997 | Barno | |
| 5,645,185 A | | 7/1997 | Cassina | |
| 5,704,477 A | | 1/1998 | Hermann et al. | |
| 5,732,839 A | | 3/1998 | Schimmang et al. | |
| 5,779,051 A | | 7/1998 | Boutin | |
| 6,050,455 A | * | 4/2000 | Soehnlen et al. | 215/382 |

* cited by examiner

*Primary Examiner*—Kevin Shaver
*Assistant Examiner*—Stephanie Willatt

(57) ABSTRACT

A stackable container for storing and dispensing a liquid has upright walls, a top wall and a bottom wall providing a chamber for storing a liquid. Adjacent upright walls are joined to corners. One corner has a bottom portion located above the plane of the bottom wall providing a space below the one corner. The top wall has a fill opening at the top of the one corner. An ON-OFF valve attached to a lower portion of the upright wall of the container is used to drain liquid from the container.

38 Claims, 8 Drawing Sheets

LIQUID STORING AND DISPENSING UNIT

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of U.S. Provisional Patent Application Serial No. 60/083,683 filed Apr. 30, 1998.

FIELD OF THE INVENTION

The invention is in the field of stackable containers for storage and dispensing of bulk liquids, such as lubricants.

BACKGROUND OF THE INVENTION

Previously 55-gallon drums have been used to store bulk liquids and fluid materials. The drums are cylindrical members having generally flat top and bottom walls. The top has an opening. A pump mounted on the top is used to pump the fluid out of the drum. Leaks and spills create messy drum tops and drum storage areas. Also, transferring the pump from one drum to another drum allows dripping of fluid from the pump. The drums cannot be stacked on top of each other which takes up space.

SUMMARY OF THE INVENTION

The invention is a stackable container for storing and dispensing of liquid in bulk quantities, such as lubricants. The container has upright walls joined to top and bottom walls to form a chamber accommodating a liquid. Adjacent upright walls are joined to corners that extend between the top and bottom walls. One corner has a bottom portion located above the bottom of the container to provide a space below the corner. A fill opening closed with a cap is formed in the top wall at the top of the one corner. When a first container is stacked on top of a second container the space below the corner is above the fill opening of the second container. Liquid can be placed in the first and second containers without separating the containers as the space allows the cap to be removed from the second container and permits liquid to be poured through the fill opening into the chamber. The upright walls have upright parallel ribs to increase the strength of the walls and enhance the appearance of the container.

The stacked containers are maintained in alignment with each other with complementary ribs and grooves in the top and bottom walls. The top wall has a plurality of linear ribs. Grooves in the bottom wall complement the size and shape of the ribs so that identical containers nested together have mating ribs and grooves that prevent relative movement between the stacked containers. A conventional ON-OFF drain valve attached to the bottom of one side wall is used to drain liquid from the chamber. The bottom of the side wall can have a recess of a size to accommodate the drain valve.

DESCRIPTION OF PREFERRED EMBODIMENTS OF THE LIQUID STORAGE AND DISPENSING UNITS.

Figure 1:
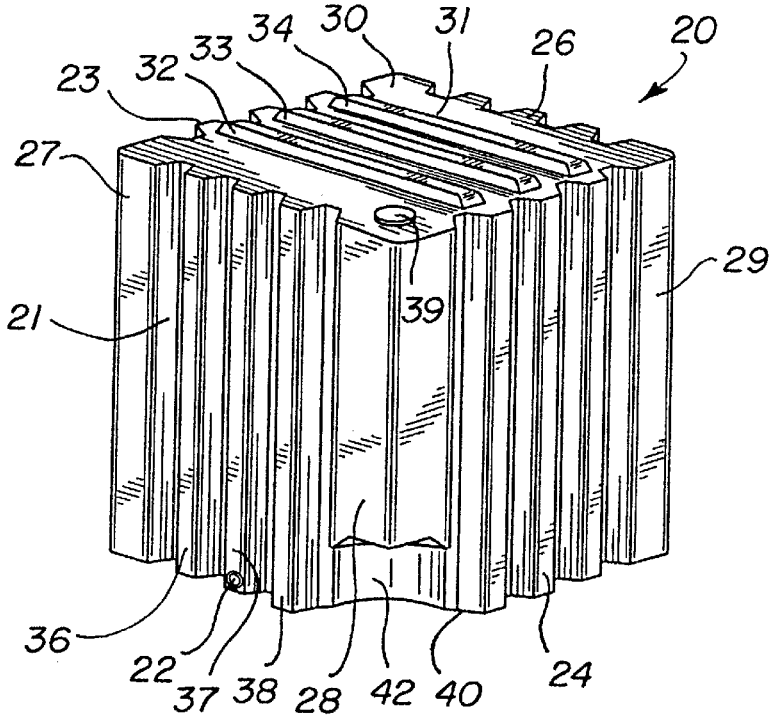
FIG. 1 is a perspective view of a liquid storage and dispensing unit of the invention.
Figure 2:
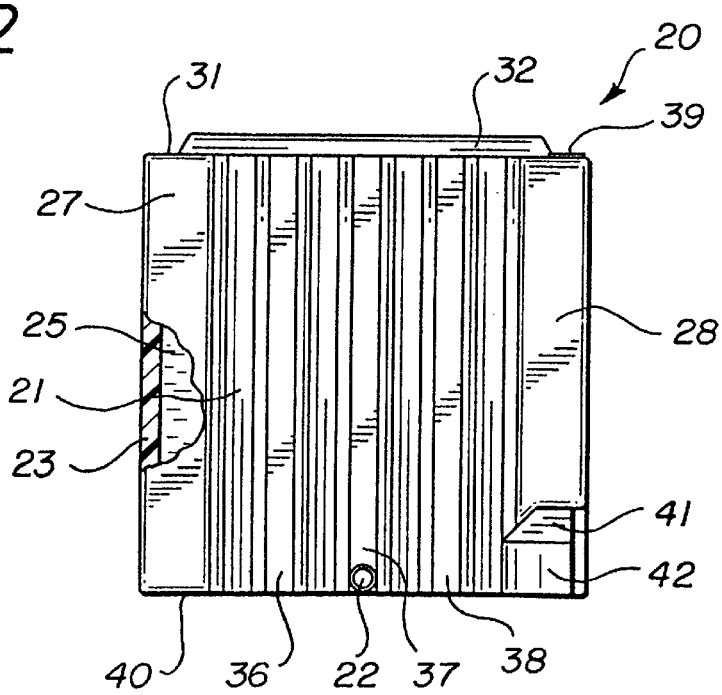
FIG. 2 is a partly sectional front elevational view thereof.
Figure 3:
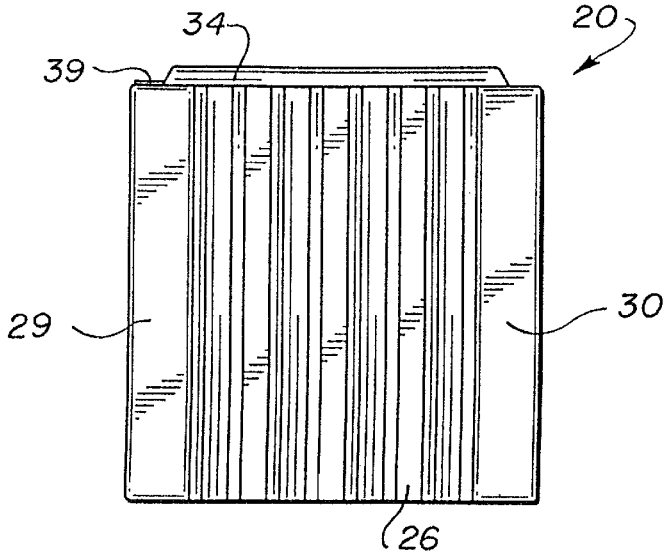
FIG. 3 is a rear elevational view thereof.
Figure 4:
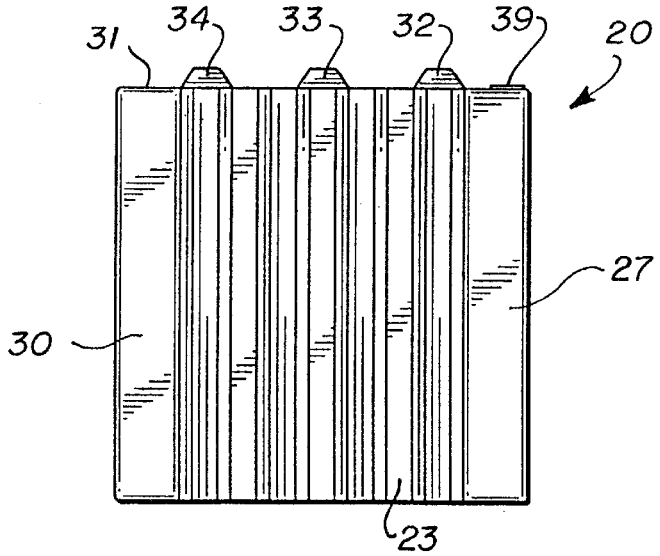
FIG. 4 is a side elevational view of the left side of FIG. 1.
Figure 5:
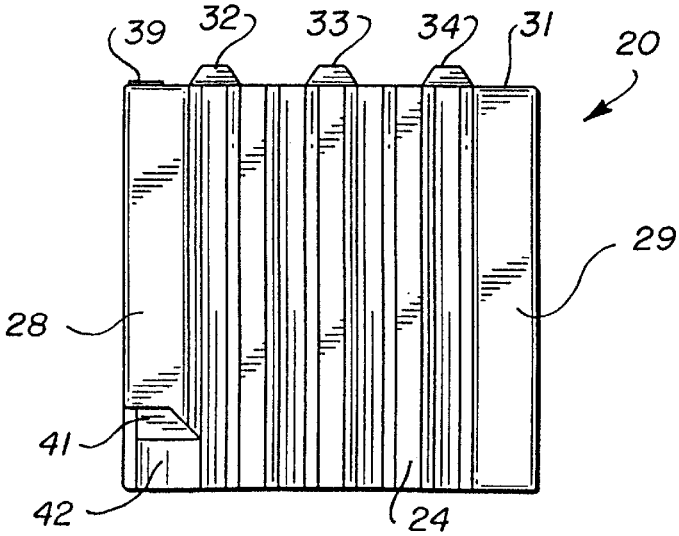
FIG. 5 is a side elevational view of the right side of FIG. 1.

Referring to FIGS. 1 and 2, liquid storage and dispensing unit 20 is a cube-shaped tank or container for storing liquid, such as bulk motor oil, anti-freeze and grease. Unit 20 has an upright front wall 21 joined to upright side walls 23 and 24, a back wall 26 and top and bottom walls 31 and 40. These walls enclose a chamber 25 for holding a liquid. Unit 20 is a one-piece container made of plastic, such as polyethylene, by a rotational molding process. The plastic is compatible with the liquid in chamber 25. Square upright corners 27, 28, 29 and 30 are located at adjacent vertical portions of walls 21, 23, 24 and 26. Each wall 21, 23, 24 and 26 has three vertical ribs 36, 37 and 38 that extend from the bottom of the top of unit 20. Each rib 36, 37 and 38 has outwardly converging or tapered sides and a flat face joined to the sides. The ribs are corrugations that increase the strength of the walls and provide unit 20 with a novel appearance. The faces of the ribs are located in the planes of the outside walls of adjacent corners.

Figure 6:
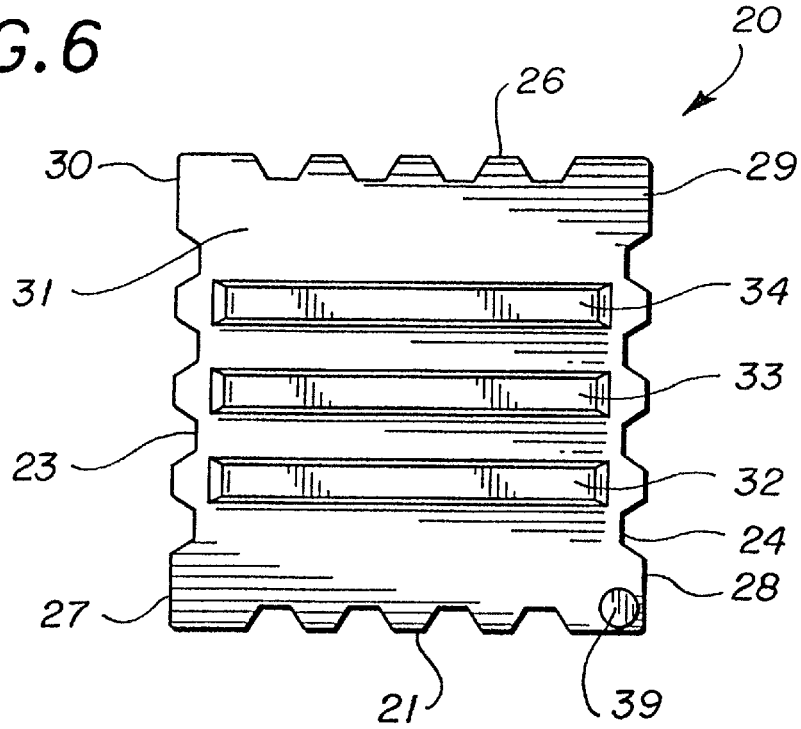
FIG. 6 is a top plan view thereof.
Figure 7:
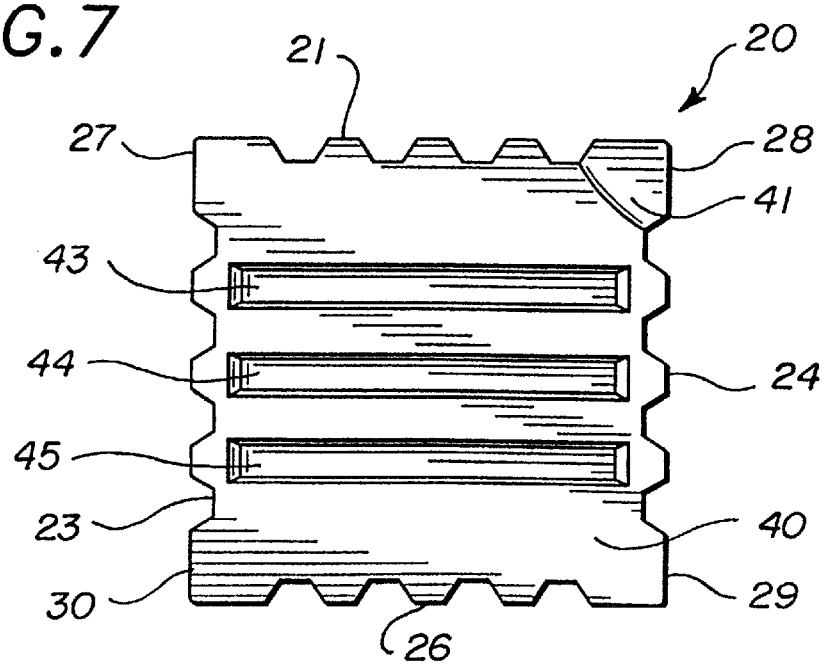
FIG. 7 is a bottom plan view thereof.
Figure 15:
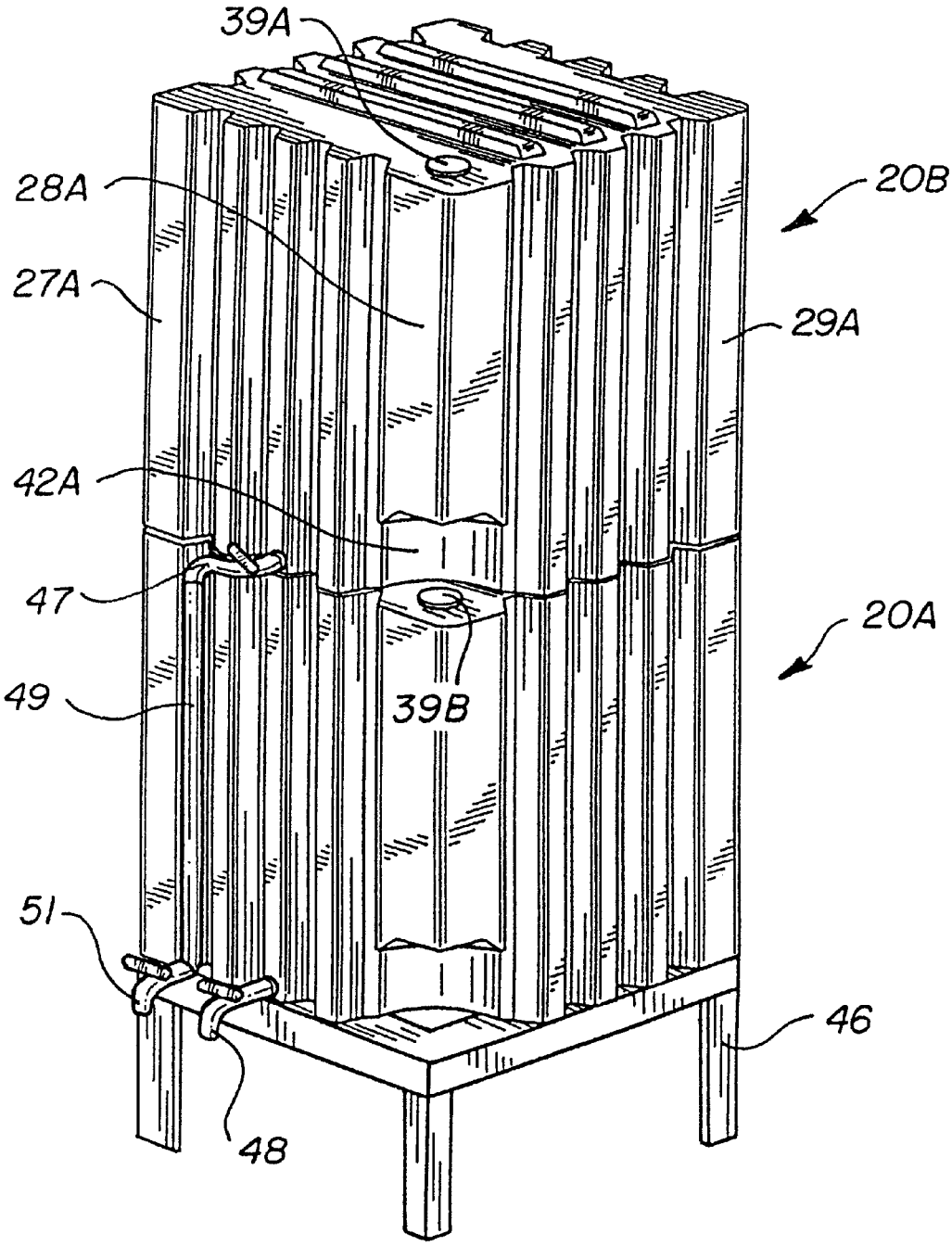
FIG. 15 is a perspective view of a pair of stacked liquid storing and dispensing units of FIG. 1.

As shown in FIG. 6, top wall 31 has three linear ribs 32, 33 and 34 that project upwardly from top wall 31. The opposite ends of each rib are located inwardly from side walls 23 and 24. Bottom wall 40, shown in FIG. 7, has three linear grooves 43, 44 and 45 that are complementary in shape and length to ribs 32, 33 and 34. Grooves 43, 44 and 45 are linear recesses of inwardly directed ribs in bottom wall 40. The ribs 32, 33 and 34 increase the strength of top wall 31 and provide keys which mate with grooves in another unit placed on top of unit 20. As shown in FIG. 15, several units 20A and 20B are stackable in an aligned and fixed orientation. The mating ribs 32, 33, 34 and grooves 43, 44, 45 prevent relative lateral movement between the top and bottom units. A stand 46 having a square frame and downwardly directed legs supports the bottom unit 20A above a support surface or floor. A conventional ON-OFF drain valve 48 is secured to unit 20A in communication with opening 22. An ON-OFF drain valve 47 mounted on the bottom of the front wall of top unit 20B is used to control the flow of liquid from unit 20B into a hose 49. Hose 49 extends from valve 47 down adjacent unit 20A to platform 46. Another ON-OFF valve 51 attached to the lower end of hose 49 allows a person to fill a container with liquid with the container resting on the floor adjacent platform 46. Valves 47 and 48 can be connected with hoses to pump used to dispense liquid to a remote location, such as a motor vehicle lube station. A conventional drain valve is shown in U.S. Pat. No. 5,259,509. Wall 21 can have a recess of a size to accommodate the drain valve.

The top of corner 28 has a fill opening, normally closed with a cap 39. When cap 39 is removed liquid can be placed in chamber 25 via the opening in the top wall above corner 28. Corner 28 has an inclined bottom wall 41 located above the horizontal plane of bottom wall 40 to provide a space 42 adjacent the bottom of corner 28. As shown in FIG. 15, when two units 20A and 20B are in stacked relation, space 42A is above fill cap 39B. The space 42A allows fill cap 39B to be removed so that liquid can be placed in chamber 25 without altering the stack relationship of units 20A and 20B.

The parts of liquid storage and dispensing unit 120 shown in FIGS. 8 to 14 and 16 that correspond to liquid storage and dispensing unit 20 have the same reference numbers with a prefix 1.

Figure 8:
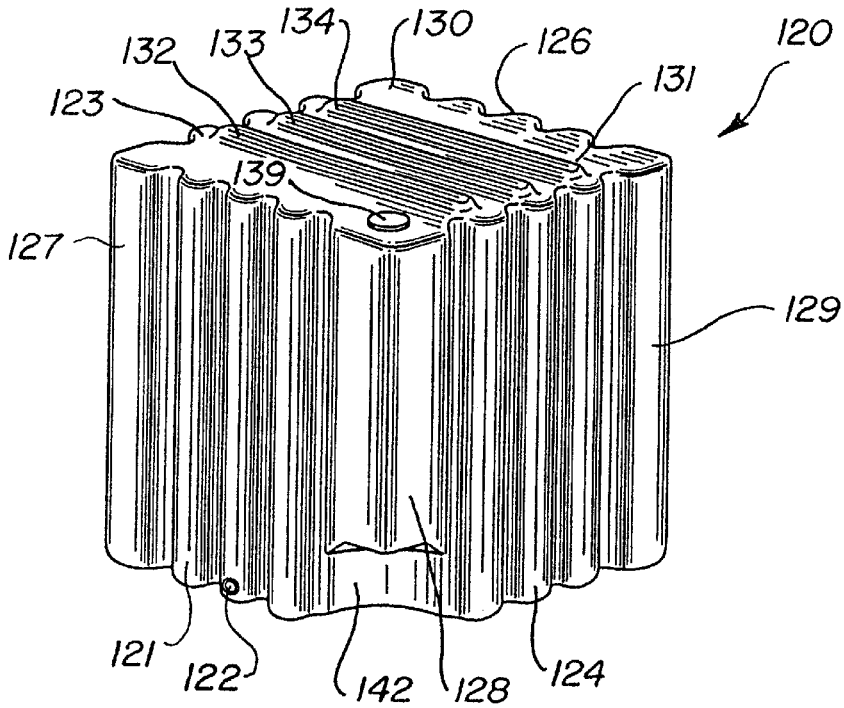
FIG. 8 is a perspective view of a modification of the liquid storage and dispensing unit of FIG. 1.
Figure 9:
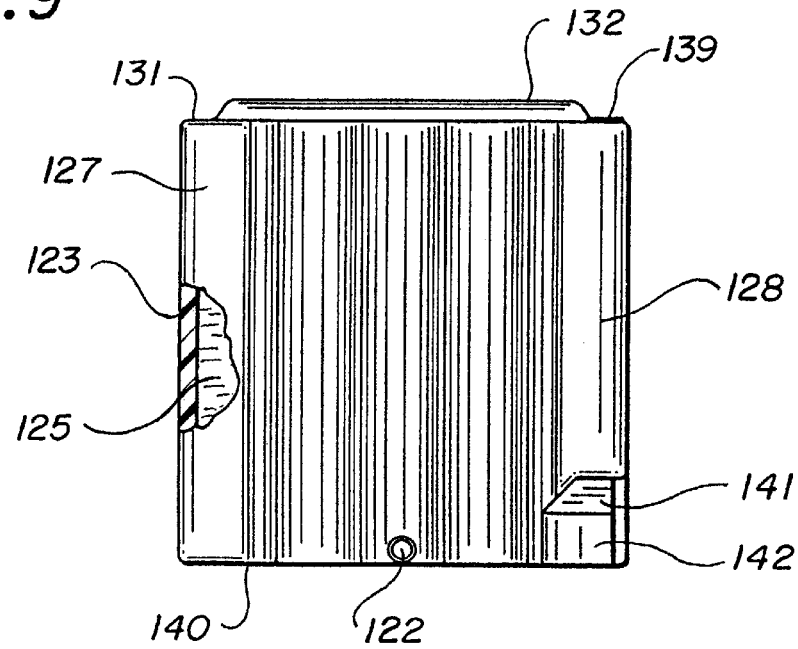
FIG. 9 is a partly sectional front elevational view of FIG. 8.
Figure 10:
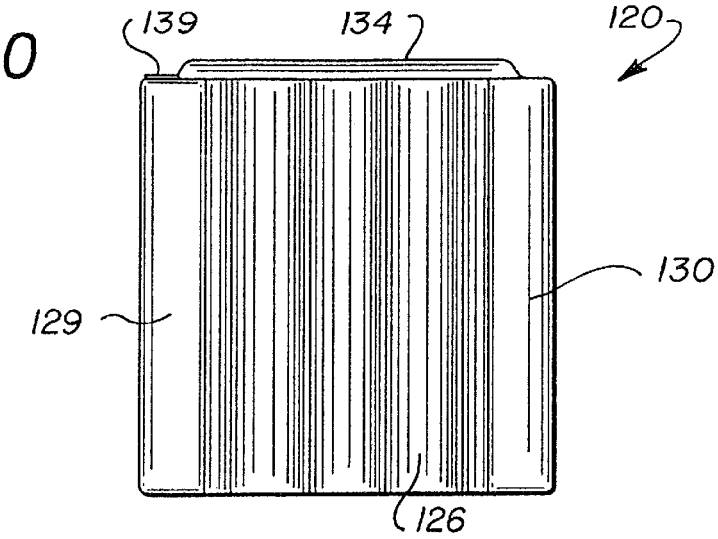
FIG. 10 is a rear elevational view of FIG. 8.
Figure 11:
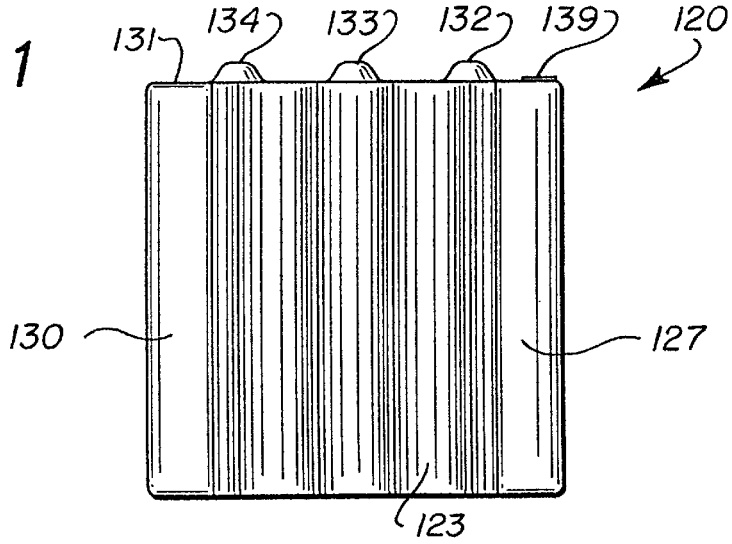
FIG. 11 is a side elevational view of the left side of FIG. 8.
Figure 12:
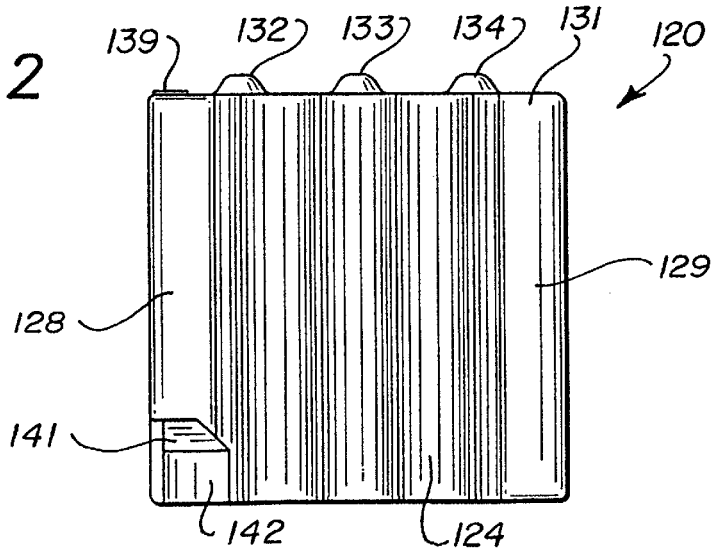
FIG. 12 is a side elevational view of the right side of FIG. 8.

Referring to FIGS. 8 and 9, liquid storage and dispensing unit 120 is a cube-shaped tank or container for storing liquid, such as bulk motor oil, anti-freeze and grease. Unit 120 has an upright front wall 121 joined to upright side walls 123 and 124, a back wall 126 and top and bottom walls 131 and 140. These walls enclose a chamber 125 for holing a liquid. Unit 120 is a one-piece container made of plastic, such as polyethylene, by a rotational molding process. The plastic is compatible with the liquid in chamber 125. Round upright corners 127, 128, 129 and 130 are located at adjacent vertical portions of walls 121, 123, 124 and 126. The round corners have uniform wall thickness and curved outer surfaces which enhance the appearance of unit 120 and eliminate abrupt edges. Each wall 121, 123, 124 and 126 has three vertical ribs 136, 137 and 138 that extend from the bottom to the top of unit 120. Each rib 136, 137 and 138 has a rounded generally semi-circular shaped cross-section. The ribs are wave corrugations that increase the strength of the walls and provide unit 120 with a smooth and novel appearance. The outer portions of the ribs are located in the planes of the outside walls of adjacent corners. The side wall portions providing the spaces between adjacent ribs have concave shapes. The front, side, and end walls have wave configurations with smooth surfaces.

Figure 13:
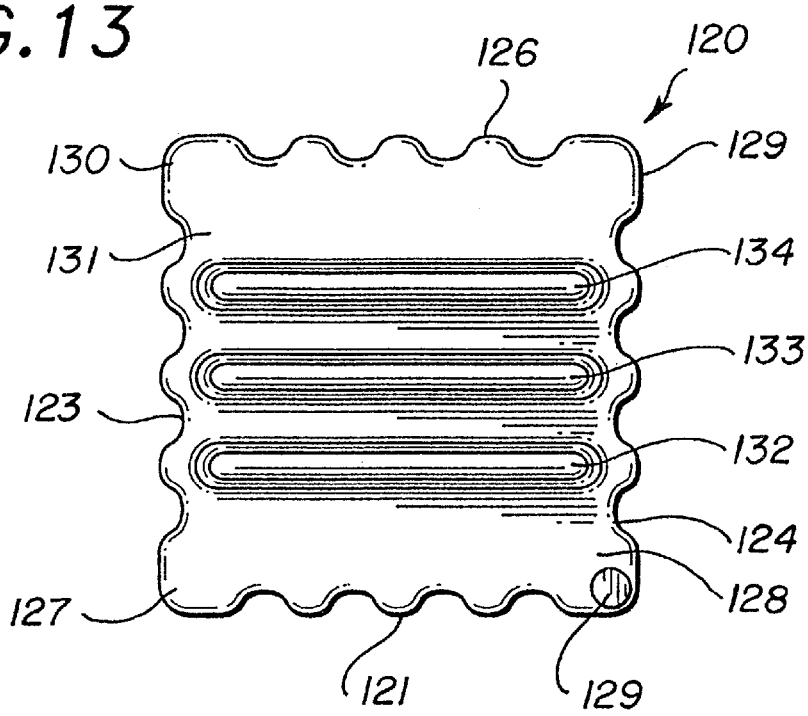
FIG. 13 is a top plan view of FIG. 8.
Figure 14:
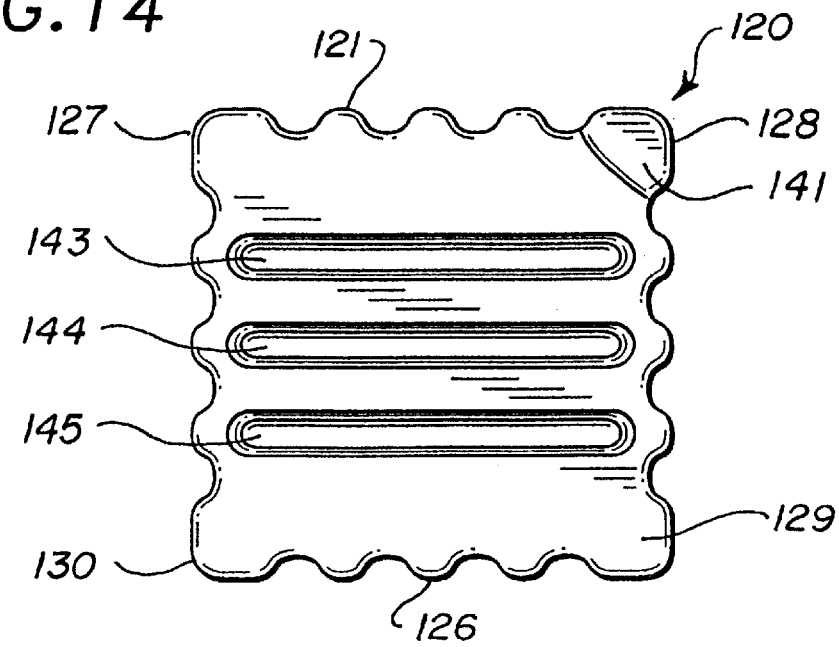
FIG. 14 is a bottom plan view of FIG. 8.

As shown in FIG. 13, top wall 131 has three linear ribs 132, 133 and 134 that project upwardly from top wall 131. The opposite ends of each rib are located inwardly from side walls 123 and 124. Bottom wall 140, as shown in FIG. 14, has three linear grooves 143, 144 and 145 that are complementary in shape and length to ribs 132, 133 and 134. Grooves 143, 144 and 145 are linear recesses of inwardly directed ribs in bottom wall 140. The ribs 132, 133 and 134 increase the strength of top wall 131 and provide keys which mate with grooves in another unit placed on top of unit 120. As shown in ligure 16, several units 120A and 120B are stackable in an aligned and fixed orientation. The mating ribs and grooves prevent relative movement between the top and bottom units. A stand 146 having a frame and downwardly extended legs supports the bottom unit 120A above a support surface or floor. A conventional ON-OFF drain valve 148 is secured to unit 120A in communication with opening 122. An ON-OFF drain valve 147 mounted on the bottom of the front wall of top unit 120B is used to control the flow of liquid from top unit 120B into a hose 149. The hose 147 extends from valve 149 down adjacent unit 120A to platform 146. Another ON-OFF valve 151 attached to the lower end of hose 149 allows a person to fill a container resting on the floor below valve 151 with liquid. Valves 147 and 148 can be connected with hoses to a pump operable to deliver liquid under pressure to a remote location, such as a motor vehicle lube station. A conventional drain valve is shown in U.S. Pat. No. 5,259,509. Wall 121 can have a recess of a size to accommodate the drain valve.

Figure 16:
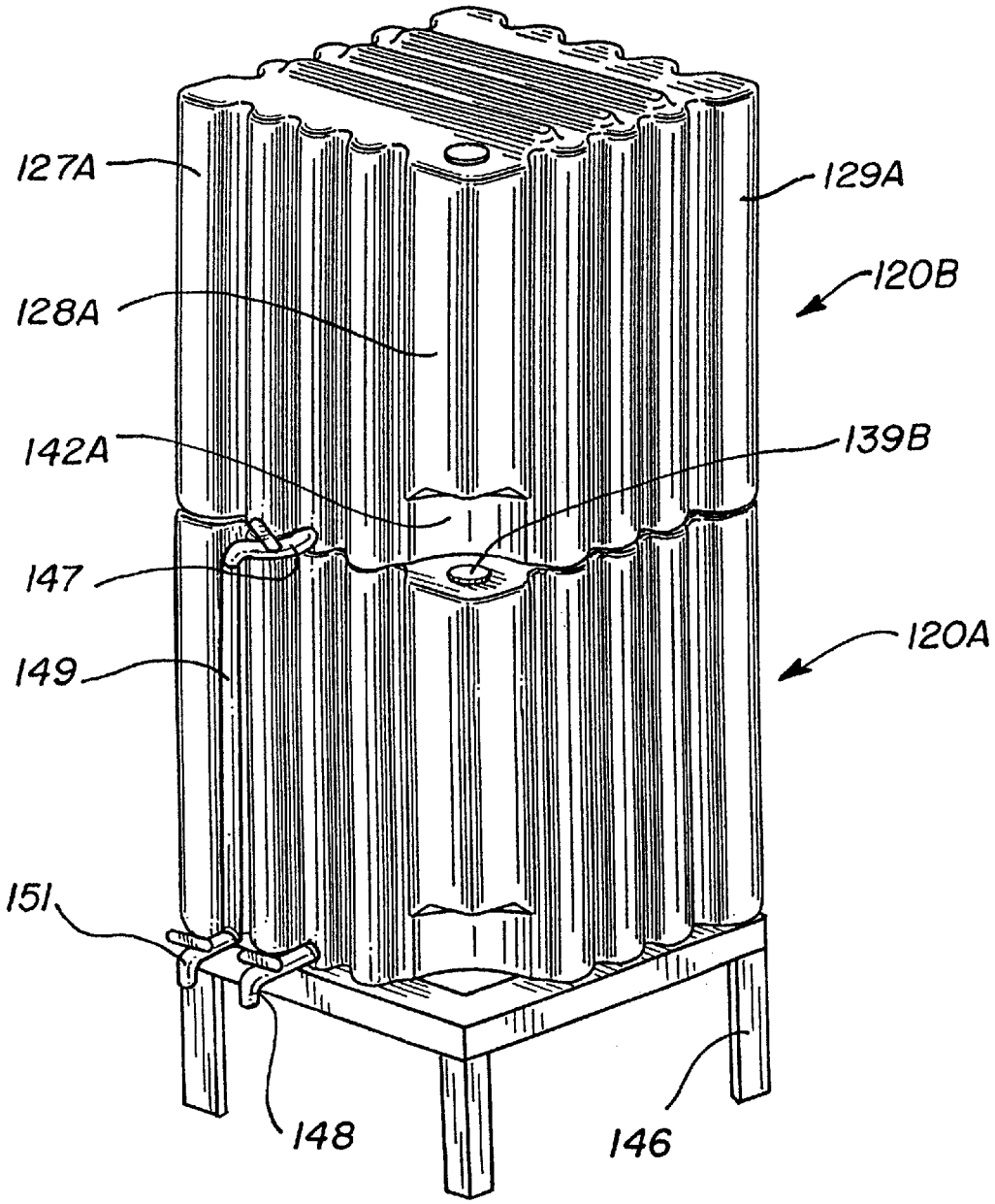
FIG. 16 is a perspective view of a pair of stacked liquid storing and dispensing units of FIG. 8.

The top of corner 128 has a fill opening normally closed with a cap 139. When cap 139 is removed liquid can be placed in chamber 125 via the opening in the top wall above corner 128. Corner 128 has an inclined bottom wall 141 located above the horizontal plane of bottom wall 140 to provide a space 142 adjacent the bottom of corner 128. As shown in FIG. 16, when two units 120A and 120B are in stacked relation, space 142A is above fill cap 139B. The space 142A allows fill cap 139B to be removed so that liquid can be placed in chamber 125 without altering the stack relationship of units 120A and 120B.

From the foregoing detailed description of the present invention it has been shown how the objects of the invention have been obtained in preferred manners. However, modifications and equivalents of the disclosed concepts, such as those which readily occur to those skilled in the art, are intended to be included within the scope of this invention. Thus, the scope of this invention is intended to be limited only by the scope of the claims which are, or which may hereafter be, appended hereto.

I claim:

1. A container for storing a liquid comprising: upright walls surrounding a chamber, a bottom wall located in a horizontal plane joined to the upright walls to retain liquid in the chamber, a top wall joined to the upright walls to close the top of the chamber, said top wall having a plurality of linear ribs and the bottom wall having a plurality of grooves having sizes and shapes that correspond to the size and shapes of the linear ribs that permit two of said container to be stacked with the ribs of one container to be mated with grooves in the other container, corners joining adjacent portions of the upright walls, a liquid fill opening in the top wall adjacent one corner, cap means attachable to the top wall to close the fill opening, said one [comer] *corner* having a bottom portion located above the horizontal plane of the bottom wall providing a space below in the one corner vertically aligned with the liquid fill opening to allow a liquid to be placed in a chamber of a container having a fill opening below the space below the bottom portion of said one corner, and valve means mounted on an upright wall adjacent the bottom wall for controlling the flow of liquid from the chamber.

2. The container of claim 1 wherein: said upright walls have a plurality of upright ribs.

3. The container of claim 2 wherein: each upright rib has outwardly converging sides and a flat front face.

4. The container of claim 2 wherein: each upright rib has a rounded upright shape.

5. The container of claim 1 wherein: each corner has a rounded outer surface.

6. The container of claim 1 wherein: each corner has a generally flat normally disposed outer surfaces.

7. A container for storing a liquid comprising: an upright wall surrounding a chamber, a bottom wall located in a horizontal plane joined to the upright wall to retain liquid in the chamber, a top wall joined to the upright walls to close the top of the chamber, said upright wall having at least one corner, a liquid fill opening in the top wall adjacent said one corner, cap means attachable to the top wall to close the fill opening, said one corner having a bottom portion located above the horizontal plane of the bottom wall providing a space below said one corner vertically aligned with the liquid fill opening to allow a liquid to be placed in the chamber of a container having a fill opening below the space below the bottom portion of said one corner.

8. The container of claim 7 wherein: said upright wall has a plurality of upright ribs.

9. The container of claim 8 wherein: each rib has outwardly converging sides and a flat front face.

10. The container of claim 8 wherein: each rib has a rounded upright shape.

11. The container of claim 7 wherein: the top wall has a plurality of ribs and the bottom wall has a plurality of grooves having sizes and shapes that correspond to the size and shapes of the ribs that permit two of said containers to be stacked with the ribs of one container to be mated with grooves in the other container.

12. The container of claim 7 wherein: the top and bottom walls have complementary ribs and grooves that permit two containers to be stacked with the ribs of one container to be mated with grooves in the other container.

13. The container of claim 7 wherein: said one corner has a rounded outer surface.

14. The container of claim 7 wherein: said one corner has a generally flat normally disposed outer surface.

15. The container of claim 7 including: valve means mounted on the upright wall adjacent the bottom wall for controlling the flow of liquid from the chamber.

16. Liquid storing and dispensing units comprising: a first container having an upright wall surrounding a chamber for storing a liquid, a bottom wall and a top wall joined to the upright wall, said upright wall having at least one corner, a liquid fill opening in the top wall adjacent said one corner, cap means attachable to the top wall to close the fill opening, and means for draining liquid from the chamber, a second container supported on the top wall of the first container having an upright wall surrounding a chamber for storing a liquid, a bottom wall and a top wall joined to the upright wall of the second container, said upright wall of the second container having at least one corner vertically aligned with the one corner of the first container, a liquid fill opening in the top wall of the second container to allow liquid to be placed in said chamber of the second container, cap means for closing the liquid fill opening of the second container, and means for draining liquid from the chamber of the second container, said one corner of the second container having a bottom portion located above the horizontal plane of the bottom wall of the second container to provide a space between the first and second containers so that the first container can be filled with liquid using the fill opening of the first container without removing the second container from the first container.

17. The liquid storing and dispensing units of claim 16 wherein: said upright wall of each container has a plurality of upright ribs.

18. The liquid storing and dispensing units of claim 16 wherein: the top wall of the first container has a plurality of ribs and the bottom wall of the second container has a plurality of grooves having sizes and shapes that correspond to the sizes and shapes of the ribs whereby the ribs fit into the grooves to prevent lateral movement of the first and second containers relative to each other.

19. The liquid storing and dispensing units of claim 16 wherein: the means for draining liquid from the chambers of the first and second containers are ON-OFF valves.

20. The liquid storing and dispensing units of claim 16 wherein: the top wall of the first container and the bottom wall of the second container have complementary ribs and grooves that prevent lateral movement of the first and second containers relative to each other.

21. Liquid storing and dispensing units comprising: a first container having an upright wall surrounding a chamber for storing a liquid, a bottom wall and a top wall joined to the upright wall, said upright wall having at least one [comer] *corner*, a liquid fill opening in the top wall adjacent said one [comer] *corner* and cap means attachable to the top wall to close the fill opening, a second container supported on the top wall of the first container having an upright wall surrounding a chamber for storing a liquid, a bottom wall and a top wall joined to the upright wall of the second container, said upright wall of the second container having at least one [comer] *corner* vertically aligned with the one [comer] *corner* of the first container, a liquid fill opening in the top wall of the second container to allow liquid to be placed in said chamber of the second container and cap means for closing the liquid fill opening of the second container, said one [comer] *corner* of the second container having a bottom portion located above the horizontal plane of the bottom wall of the second container to provide a space between the first and second containers so that the first container can be filled with liquid using the fill opening of the first container without removing the second container from the first container.

22. The liquid storing and dispensing units of claim 21 wherein: said upright wall of each container has a plurality of upright ribs.

23. The liquid storing and dispensing units of claim 21 wherein: the top wall of the first container has a plurality of ribs, and the bottom wall of the second container has a plurality of grooves having sizes and shapes that correspond to the sizes and shapes of the ribs whereby the ribs fit into the grooves to prevent lateral movement of the first and second containers relative to each other.

24. The liquid storing and dispensing units of claim 21 wherein: the top wall of the first container and the bottom wall of the second container have complementary ribs and grooves that prevent lateral movement of the first and second containers relative to each other.

*25. A container for storing a liquid comprising: an upright wall surrounding a chamber, a bottom wall located in a horizontal plane joined to the upright wall to retain liquid in the chamber, a top wall joined to the upright wall to close the chamber, said upright wall having adjacent laterally spaced upright corners, and a recessed wall section in a lower portion thereof located adjacent one of said corners providing a space, a liquid fill opening in the top wall vertically aligned with said space provided by the recessed wall section, cap means attachable to the top wall to close the fill opening, said recessed wall section having an inwardly extended upper portion located above the horizontal plane of the bottom wall and a downwardly directed back portion joined to the inwardly extended upper portion and the bottom wall, said space being below said recessed wall section and outwardly of the back portion whereby the space is open to the outside of the side and bottom of the container, said space being vertically alignable with a liquid fill opening of a second container to allow a liquid to be placed in the second container having its fill opening located below the space provided by the recessed wall section without removing the container from the second container, and valve means mounted on the upright wall adjacent the bottom wall for controlling the flow of liquid from the chamber of the container.*

*26. The container of claim 25 wherein: said upright wall has a plurality of upright ribs.*

*27. A container for storing a liquid comprising: an upright wall, a bottom wall, and a top wall, said walls*

*surrounding a chamber for storing a liquid, said upright wall having adjacent laterally spaced upright corners, and a recessed wall section located adjacent the bottom wall and adjacent one of said corners, said recessed wall section having an upper wall portion located above the bottom wall and extended inwardly into the chamber and a downwardly directed back portion joined to the inwardly extended upper portion and the bottom wall providing a space below the upper wall portion and outwardly of the back portion adjacent said one of said corners whereby the space is open to the outside of the side and bottom of the container to allow a liquid to be placed in a chamber of a second chamber having a fill opening located below the space of the recessed wall section without removing the container from the second container, a liquid fill opening in the top wall of the first container vertically aligned with the space provided by the recessed wall section, cap means attachable to the top wall to close the fill opening of the first container, and valve means mounted on the upright wall adjacent the bottom wall for controlling the flow of liquid from the chamber of the container.*

*28. The container of claim 27 wherein: said upright wall has a plurality of upright ribs.*

*29. Liquid storing and dispensing units comprising: a first container having an upright wall surrounding a chamber for storing a liquid, a bottom wall and a top wall joined to the upright wall, said upright wall having at least one corner, said upright wall having a recessed wall section in a lower portion thereof providing a space, a liquid fill opening in the top wall adjacent said one corner and vertically aligned with said space provided by the wall section, cap means attachable to the top wall to close the fill opening, and means for draining liquid from the chamber, a second container supported on the top wall of the first container having an upright wall surrounding a chamber for storing a liquid, a bottom wall and a top wall joined to the upright wall of the second container, said upright wall of the second container having a recessed wall section in a lower portion thereof providing a space vertically aligned with the fill opening in the top wall of the first container, a liquid fill opening in the top wall of the second container to allow liquid to be placed in said chamber of the second container, cap means for closing the liquid fill opening of the second container, said means for draining liquid from the chamber of the second container, said recessed wall section of the second container having a bottom portion located above the horizontal plane of the bottom wall of the second container to provide said space between the first and second containers so that the first container can be filled with liquid using the fill opening of the first container without removing the second container from the first container.*

*30. The liquid storing and dispensing units of claim 29 wherein: said upright wall of each container has a plurality of upright ribs.*

*31. The liquid storing and dispensing units of claim 29 wherein: the means for draining liquid from the chambers of the first and second containers comprise valve means mounted on the upright wall adjacent the bottom wall of each container for controlling the flow of liquid from the chambers of said containers.*

*32. The liquid storing and dispensing units of claim 31 wherein: said upright walls of each container has a plurality of upright ribs.*

*33. Liquid storing and dispensing units comprising: a first container having an upright wall, a bottom wall, and a top wall, said walls surrounding a chamber for storing a liquid, said upright wall having at least one corner and a recessed wall section located adjacent the one corner and the bottom wall, said recessed wall section having a wall portion located above the bottom wall and extended inwardly into the chamber providing a space between the bottom wall and the wall portion of the recessed wall section, a liquid fill opening in the top wall vertically aligned with the space, cap means attachable to the top wall to close the fill opening, valve means mounted on the upright wall adjacent the bottom wall for controlling the flow of liquid from the chamber of the first container, a second container supported on the top wall of the first container, said second container having an upright wall, a bottom wall, and a top wall, said walls surrounding a chamber for storing a liquid, said upright wall of the second container having a recessed wall section having a wall portion located above the bottom wall of the second container and extended inwardly into the chamber of the second container providing a space between the bottom wall and the wall portion of the recessed wall section of the second container, said space provided by the recessed wall section of the second container being located above the fill opening in the top wall of the first container so that the first container can be filled with a liquid using the fill opening of the first container without removing the second container from the first container.*

*34. A method of filling and storing a liquid in a first container supporting a second container on top of the first container without removing the second container from the first container comprising: providing a first container having an upright wall, a bottom wall and a top wall surrounding a first chamber for storing a liquid, and a liquid fill opening in the top wall open to the first chamber and located adjacent a portion of the upright wall, providing a second container having an upright wall including adjacent laterally spaced upright corners, a bottom wall, and a top wall surrounding a second chamber for storing a liquid, and a liquid fill opening in the top wall open to the second chamber, said upright wall of the second container having a recessed wall section located adjacent one of said corners, said recessed wall section having a wall portion located above the bottom wall of the second container and extended inwardly into the second chamber providing a space between the bottom wall and the wall portion of the recessed wall section of the second container adjacent said one of said corners and supporting the second container on the first container with the space between the bottom wall and the wall portion of the recessed wall section of the second container located above the liquid fill opening in the top wall of the first container, and filling the first container with a liquid using the fill opening of the first container without removing the second container from the first container.*

*35. The method of claim 34 including: maintaining the first and second containers in vertical alignment with each other with cooperating ribs and grooves in the adjacent top and bottom walls of the first and second containers.*

*36. A method of filling and storing a liquid in a first container supporting a second container on top of the first container without removing the second container from the first container comprising: providing a first container having first wall means including adjacent laterally spaced upright first corners, a first bottom wall and a first top wall surrounding a first chamber for storing a liquid, said first wall means including a first recessed wall section located adjacent one of said first corners providing a first space open to the outside of the first wall means and first bottom wall adjacent said one of said first corners, and a first liquid fill opening in the first top wall vertically aligned with the first recess open to the first chamber, providing a second*

*container having second wall means including adjacent laterally spaced upright second corners, a second bottom wall and a second top wall surrounding a second chamber for storing a liquid, said second wall means including a second recessed wall section located adjacent one of said second corners providing a second space open to the outside of the second wall means and second bottom wall adjacent said one of the second corners, and second liquid fill opening in the second top wall vertically aligned with the second recess open to the second chamber, locating the second bottom wall of the second container on the first top wall of the first container to support the second container on the first container with the second space located above the first liquid fill opening in the first top wall of the first container, and filling the first container with a liquid using the first fill opening in the first top wall of the first container without removing the second container from the first container.*

*37. The method of claim 36 including: maintaining the first and second containers in vertical alignment with each other with cooperating ribs and grooves in the adjacent first top wall and second bottom wall of the first and second containers.*

*38. The method of claim 36 including: filling the second container with liquid using the second fill opening without removing the second container from the first container.*

* * * * *